H. Last,
Gate Latch,
No. 45,162. Patented Nov. 22, 1864.
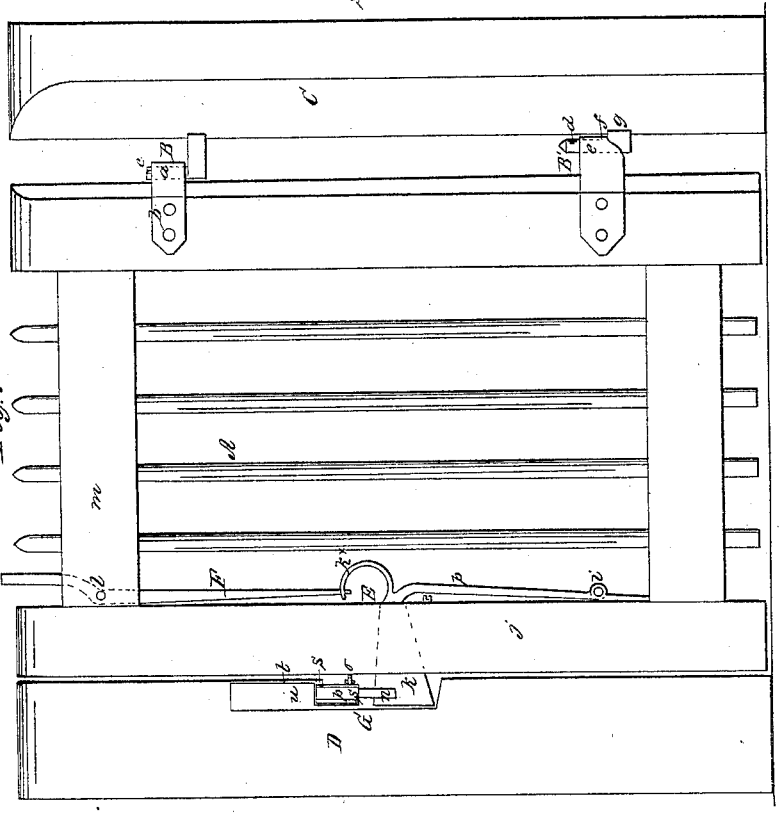

UNITED STATES PATENT OFFICE.

HENRY LAST, OF WEST LEBANON, INDIANA.

IMPROVED GATE-FASTENING.

Specification forming part of Letters Patent No. 45,162, dated November 22, 1864.

*To all whom it may concern:*

Be it known that I, HENRY LAST, of West Lebanon, in the county of Warren and State of Indiana, have invented a new and Improved Gate-Fastening; and I do hereby declare that the following is a full, clear, and exact description thereof, which will enable others skilled in the art to make and use the same, reference being had to the accompanying drawings, forming part of this specification, in which—

Figure 1 is a side view of a gate having my improvement applied to it; Fig. 2, a detached view of the catch pertaining to the same, a portion of the outer plate being broken away in order to show the interior; Fig. 3, a vertical section of Fig. 2 taken in the line $x\,x$.

Similar letters of reference indicate like parts.

This invention relates to a new and improved fastening for gates, and has for its object the ready opening of the gate by an equestrian without the necessity of dismounting, and at the same time admit of the gate closing and fastening itself without the liability of the fastening being injured by jars or concussions, however violently the gate may close.

A represents a gate, which may be constructed in any of the known forms, and connected by hinges B B' to a post, C, the fastening of the gate being on the post D. The upper hinge, B, is composed simply of an eye, $a$, attached to the gate by a metal strap, $b$, the eye being fitted on an upright pintle, $c$, attached to post C. The lower hinge, B', is composed of a similar pintle, $d$, attached to post C, and an eye, $e$, attached to the gate; but the lower edge of the eye $e$ at its outer side has a V-shaped notch, $f$, made in it, and the pintle-bar $g$, which is driven into the post D, has its upper surface adjoining the pintle made in V form, so that when the gate is opened in either direction (it being arranged to swing both ways) it will gradually rise and assume a slightly-inclined position, its upper end inclining toward the post D, and thereby having a tendency to close by its own gravity. This plan for causing a gate to close by its own gravity is not new. The same device substantially has been in use many years, as also several modifications of it.

E represents the latch portion of the fastening, which is attached to the gate A, the chief portion of which is bar $h$, having its lower end provided with a joint or hinge, $i$, and attached to the stile $j$ of the gate, which adjoins the post D when the gate is closed. The upper part, $k$, of this bar is bent over horizontally, and is broad and flat, and passes through a mortise in the stile $j$, the back end of $k$ being provided with a curved shank or tang, $k^x$, in the upper part of which there is a hole for the lower end of an upright lever, F, to pass through, said lever having its fulcrum-pin $l$ in the upper cross-bar, $m$, of the gate, and the upper end of said lever extending a short distance above the cross-bar $m$, as shown clearly in Fig. 1. The part $k$ of the latch E has a tendency to project through and beyond the stile $j$ of the gate the full length of said movement by its own gravity.

G represents the catch portion of the fastening, which is applied to the post D. It is composed of two drops, $n\,n$, which work on pivots $o\,o$ in a small case, $p$, the latter being open at the bottom for the drops $n$ to project down below the case, the former resting upon or being supported by pins $q$, which pass through holes $p$ in the drops, as shown clearly in Fig. 2. When the drops are down, their lower edges are inclined portions, as shown in Fig. 2, their inner ends being considerably lower than their outer ends, and they have a tendency to retain this position by virtue of their own gravity. A space is allowed between the inner ends of the two drops to receive the part $k$ of the latch E.

The case $p$, in which the drops $n\,n$ are fitted, is placed between horizontal guides $s\,s$, attached to the post D. These guides admit of the case moving horizontally in either direction, the case being retained between the guides by means of a plate, $t$. Directly above the guides $s\,s$ there is a box, $u$, in which two springs, $v\,v$, of india-rubber or other suitable material, are placed, and a vertical projection, $u$, at the center of the top of the case $p$, extends up between the springs $v\,v$, as shown in Fig. 2. These springs $v\,v$ have a tendency to keep the case $p$ in a central position between the two sides of post D, and at the same time they allow the case $p$ to yield or give as the gate is closed in either direction, thereby avoiding injury to any of the parts of the fastening which might otherwise occur by jars or concussions, and also preventing the drops from being forced upward by jars, so that the part k of the latch can recoil and pass them and fail to catch between them.

It will be seen that an equestrian can draw back the part k of the latch free from the drops n n by actuating the upper end of lever F, which may be done without dismounting, and the gate in closing fastens itself, the part k of the latch throwing up the u with which it comes first in contact, and being stopped by the inner end of the other drop n, the first drop falling after k has passed it.

I do not confine myself to the precise arrangement of the springs v v, as herein shown and described, for they may be arranged in various ways and the same end attained.

I claim as new and desire to secure by Letters Patent—

The latch E, provided with a lever, F, applied to the gate A substantially as shown, in combination with a drop-catch, G, arranged with a spring or springs in such a manner that said catch may to a certain extent yield or give to the latch as the latter impinges against the drops as the gate closes, substantially as and for the purpose set forth.

HENRY LAST.

Witnesses:
WILLIAM BELL,
EDWIN FLEMING.